United States Patent [19]
Zangiacomi et al.

[11] 4,223,976
[45] Sep. 23, 1980

[54] OPTICAL FIBER JUNCTION DEVICE NOTABLY FOR TELECOMMUNICATIONS

[75] Inventors: Fernand Zangiacomi; Robert Gautheret, both of Besançon, France

[73] Assignee: France Ebauches, Besancon, France

[21] Appl. No.: 955,517

[22] Filed: Oct. 30, 1978

[30] Foreign Application Priority Data

Nov. 2, 1977 [FR] France .................. 77 32968
Dec. 19, 1977 [FR] France .................. 77 38174

[51] Int. Cl.³ .................................... G02B 5/14
[52] U.S. Cl. .................................... 350/96.21
[58] Field of Search ................... 350/96.21, 96.22

[56] References Cited
U.S. PATENT DOCUMENTS

| | | | |
|---|---|---|---|
| 4,099,832 | 7/1978 | Warner | 350/96.21 |
| 4,123,139 | 10/1978 | Sandahl | 350/96.21 |
| 4,142,777 | 3/1979 | Gauthier | 350/96.21 |

FOREIGN PATENT DOCUMENTS 2344853 10/1977 France .................. 350/96.21

*Primary Examiner*—Stewart J. Levy
*Attorney, Agent, or Firm*—Learman & McCulloch

[57] ABSTRACT

The device includes a tubular connector traversed by a bore designed to house two optical fiber terminations to be connected, said terminations being composed of three spacing rods tangential to one another and to the fiber and a base provided with a stop shoulder. Countersunk holes are formed at the periphery of the connector so as to leave only thin walls or webs; these are deformed towards the axis of said connector so as to exert an elastic pressure on the terminations of the fibers, which are guided axially and positioned angularly with respect to one another by pins extending inside the bore and engaged in the grooves formed by two adjacent spacing rods of said terminations. The device is aplied to optical transmissions and notably in telecommunications.

14 Claims, 23 Drawing Figures

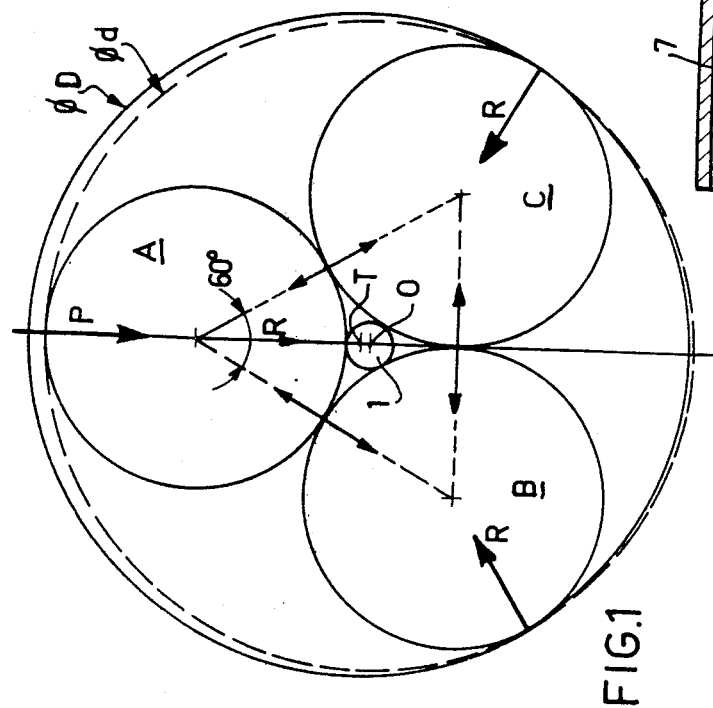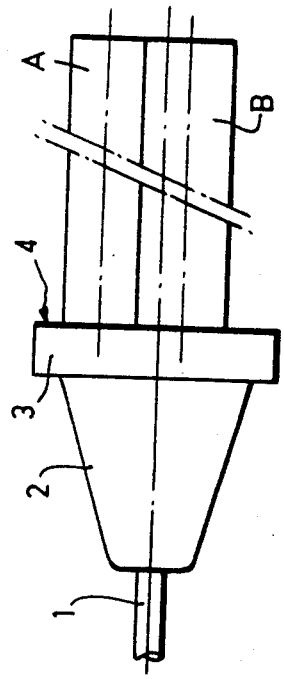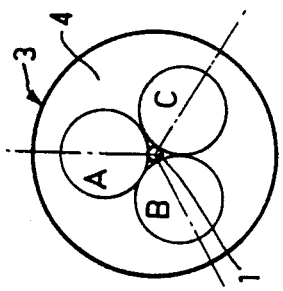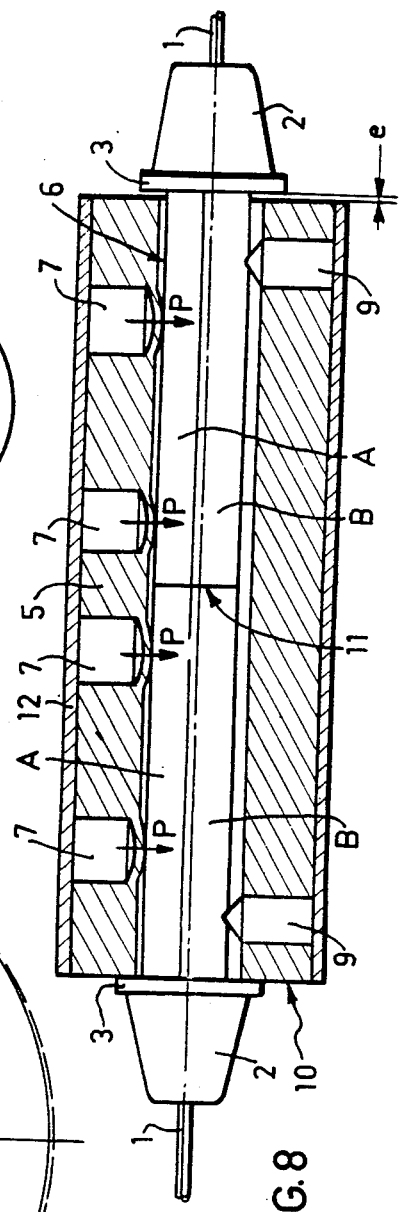

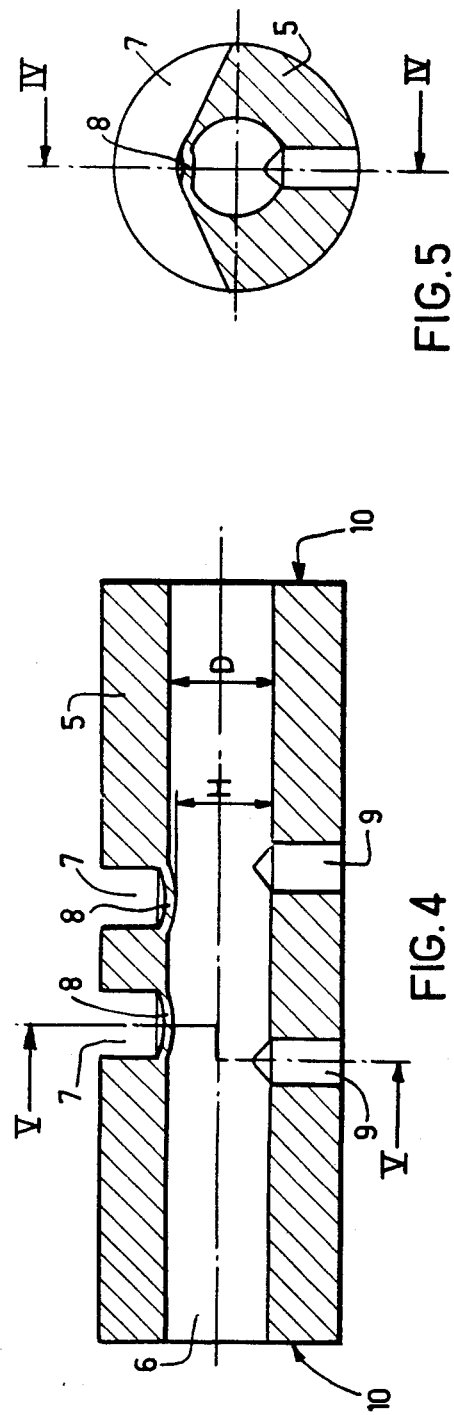
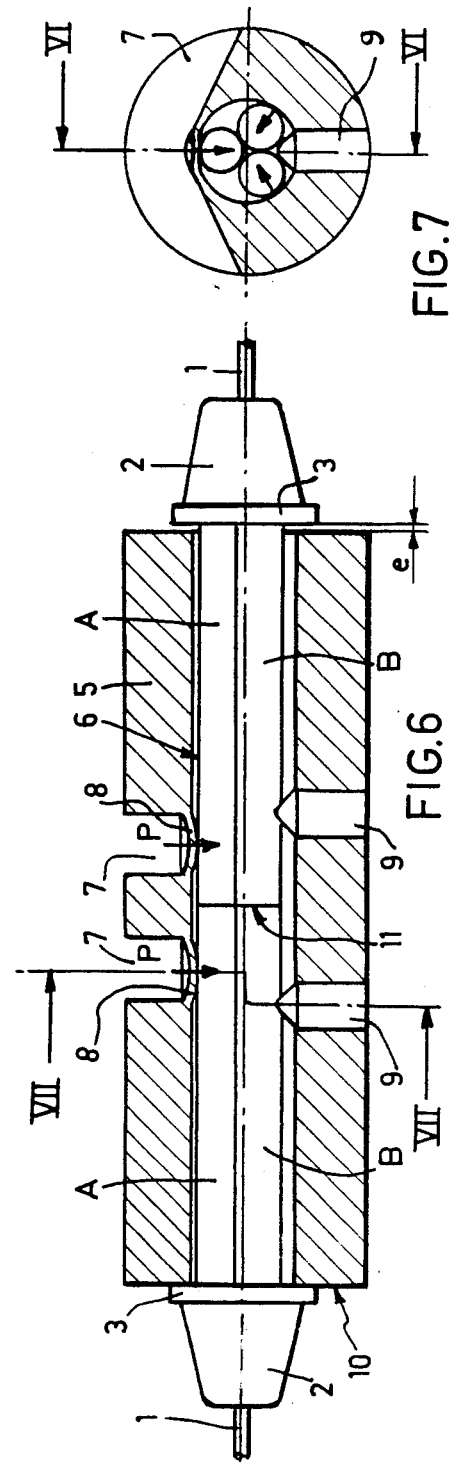

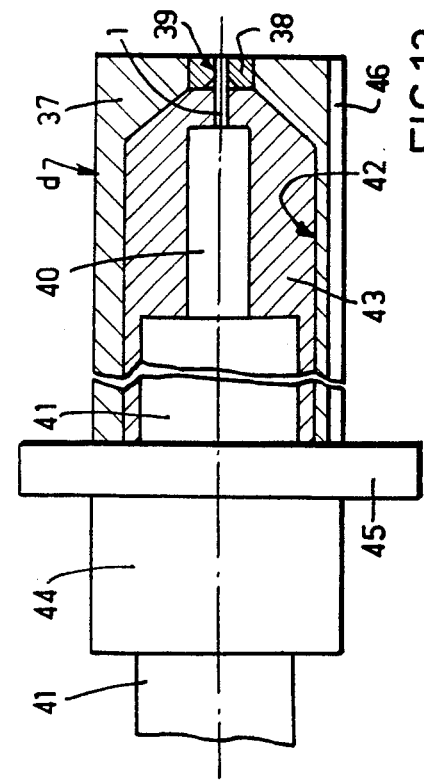
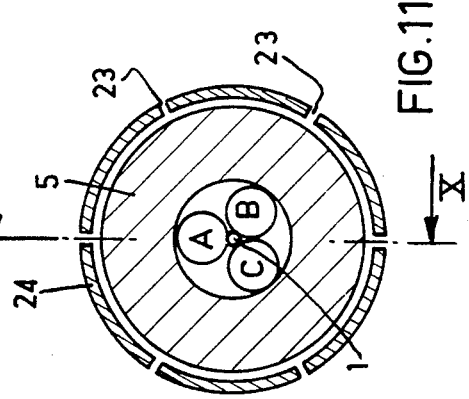
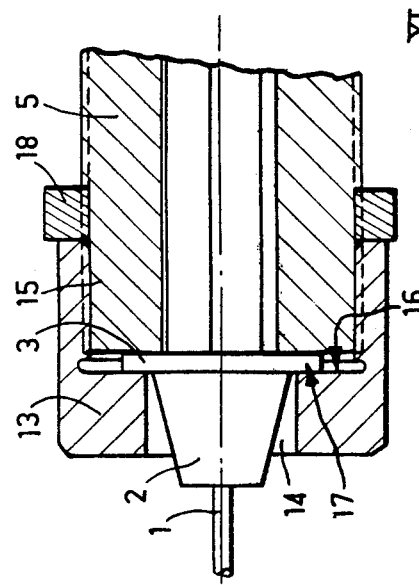
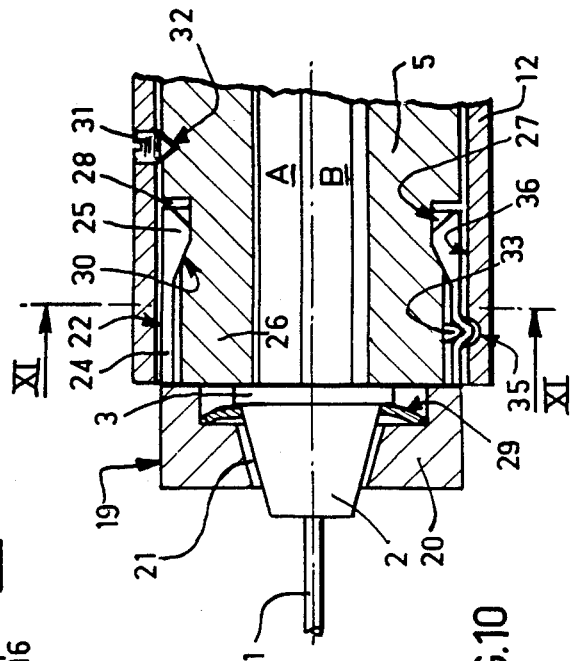
FIG.9
FIG.10
FIG.11
FIG.12

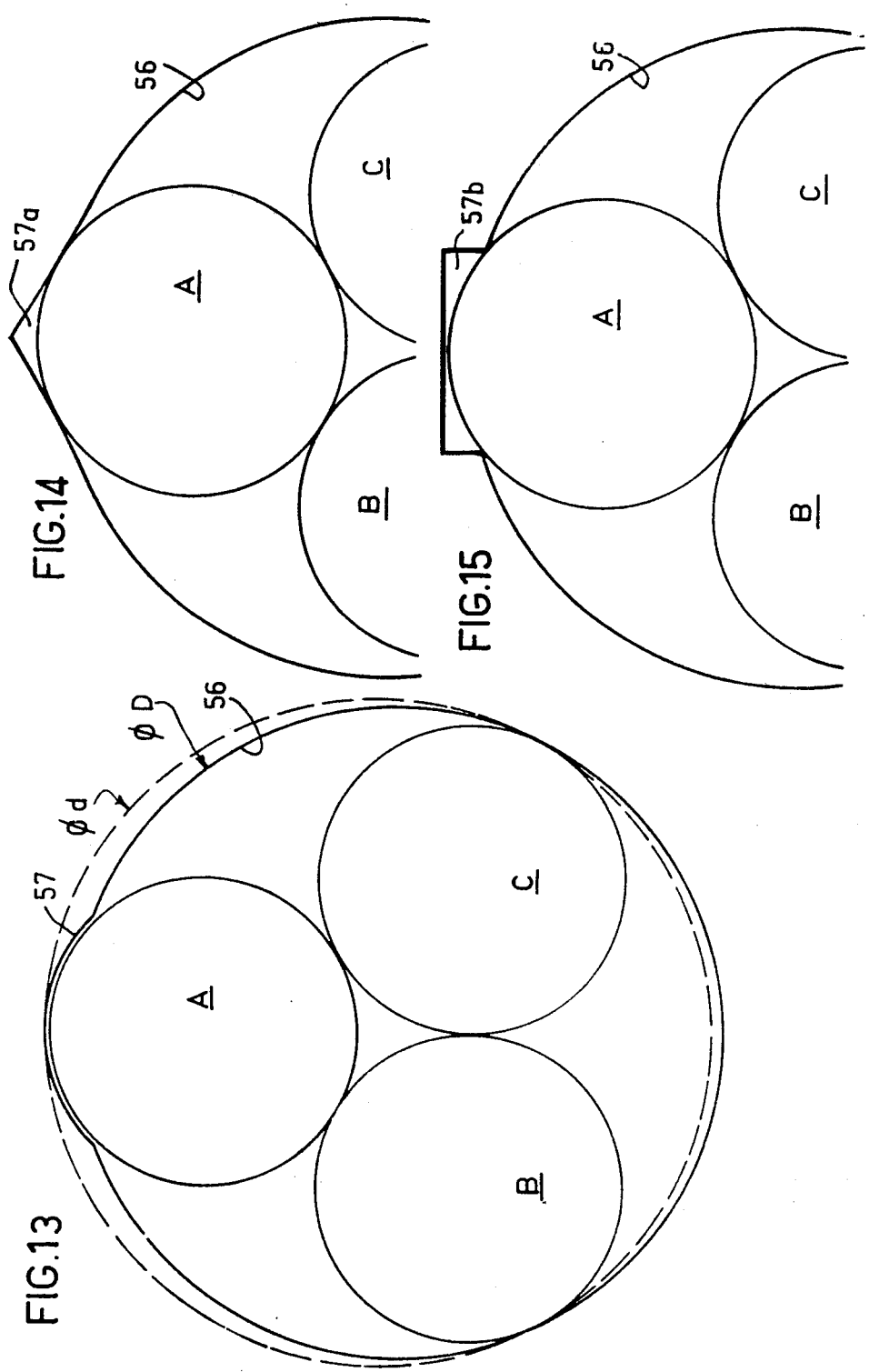

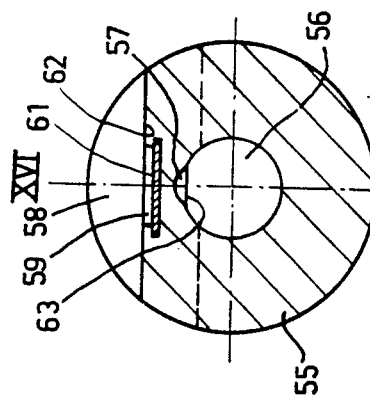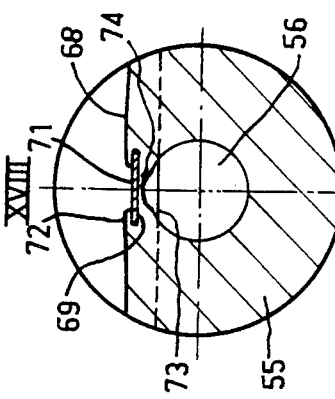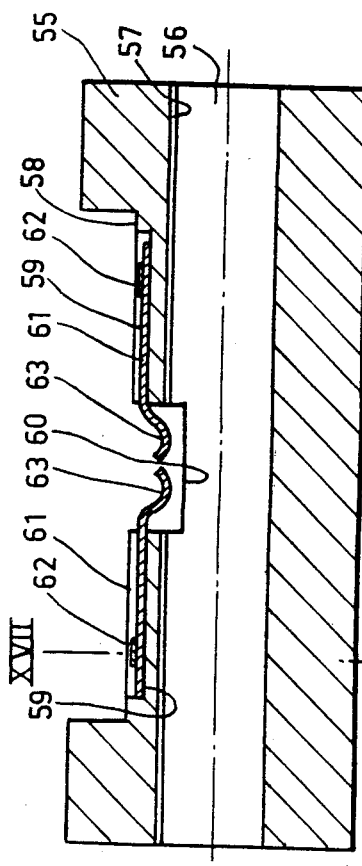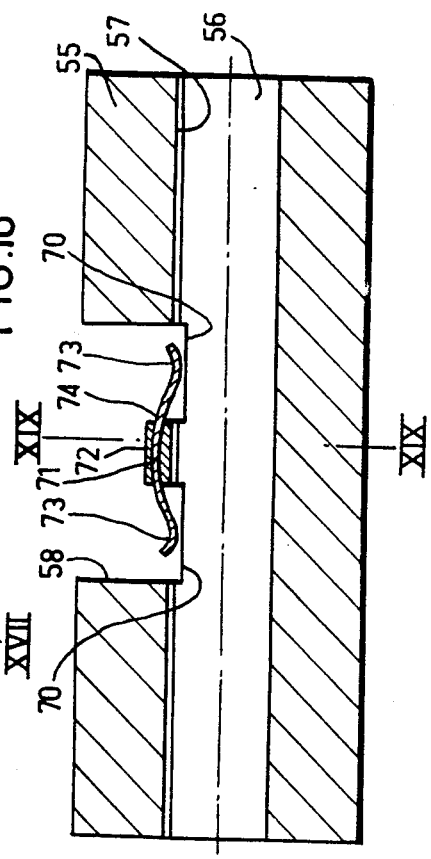

OPTICAL FIBER JUNCTION DEVICE NOTABLY FOR TELECOMMUNICATIONS

FIELD OF THE INVENTION

The present invention relates to an optical fiber junction device. The invention is applied more particularly in the field of optical fiber telecommunications systems.

DESCRIPTION OF THE PRIOR ART

Construction of telecommunications systems based on optical fibers is dependent upon the production of lines of low attenuation. At the present time, fibers are currently produced having an attenuation of less than 5 dB/km, but the attenuations in a telecommunications line of great length arise also from imperfections in connections between two fiber sections, and since these connections are large in number, it is necessary as much as possible reduce to the local disturbances produced by each of them and resulting notably from an imperfection in the junction such as a radial or axial misalignment or again imperfect contact between the joining faces of two fibers.

Hence it is important to provide for the production of joining devices constructed with great precision to obtain the best possible alignment between the fibers. Among the presently known connectors, there exist numerous types of which the majority are extremely complex. Among the simplest may be mentioned the utilization of a vee machined with very great precision, at the bottom of which the two fibers are arranged end-to-end and pressed by means of an elastic pressure means, the assembly being lodged inside a tubular sleeve. This type of connector, although constituted by means of a minimum of parts, is nonetheless extremely expensive on account of the very high machining precision required.

It is therefore an object of the invention to provide an optical fiber junction device ensuring alignment of great precision between the fibers, although simple and economical to produce, and permitting rapid and simplified assembly of the two fibers to be connected.

GENERAL DESCRIPTION OF THE INVENTION

According to the invention, the optical fiber junction device, notably for use in telecommunications, comprises two terminations for stiffening the ends of the two fibers to be aligned, as well as a connector provided to receive said terminations and to hold them joined end-to-end in perfect alignment; the terminations are essentially constituted by at least three identical, cylindrical spacing (position-fixing) rods tangential to one another along their generatrices, said spacing rods gripping the end of the corresponding optical fiber axially, and the connector comprises a bore of diameter slightly greater than the diameter of the cylinder circumscribed about the spacing rods of the terminations of the two fibers, as well as radial pressure means designed to apply said terminations to the opposite in-curved side of the bore, and reciprocal axial guide and angular positioning means of said terminations. In a preferred form, the radial pressure means of the connector are constituted for each termination by a thinned wall portion of the bore of the latter, the said wall portion being pushed in toward the axis so as to reduce the passage cross-section in said bore. In the same way, the reciprocal guide and angular positioning means of the terminations of the two fibers to be connected are essentially constituted by elements projecting into the bore and arranged so that one spacing rod of each termination becomes positioned beneath a corresponding pressure means.

According to the invention, the spacing rods of the terminations ensure not only centering of the corresponding optical fiber, but also the rectilinear stiffening of the end of the latter as well as protection against mechanical effects (shocks, bending, etc.) to which it may be subjected. As for the connector, it enables precise alignment of the optical fibers to be achieved, on the one hand, by positioning them angularly in the same manner, and on the other hand, by pushing in the two terminations on the same side of the wall of the bore, which has the effect of centering them in the same manner with respect to the axis of said bore, thus compensating for the sliding play and, due to the fact that identical terminations are provided, aligning the joining fibers with precision.

BRIEF DESCRIPTION OF THE DRAWINGS

The invention will now be described in more detail, with reference to embodiments given by way of non-limiting example, and shown in the accompanying drawings.

FIG. 1 is a schematic diagram of the centering of an optical fiber termination according to the invention;

FIG. 2 is a side view of one embodiment of an optical fiber termination according to the invention;

FIG. 3 is an end view of the embodiment of FIG. 2;

FIG. 4 is a longitudinal section of a connector according to an embodiment of the invention and taken on the line IV—IV of FIG. 5;

FIG. 5 is a cross-section along the line V—V of FIG. 4;

FIG. 6 is a longitudinal section of an assembled junction device according to the invention and taken on the line VI—VI of FIG. 7;

FIG. 7 is a radial section along the line VII—VII of FIG. 6;

FIG. 8 is a longitudinal section of an assembled junction device according to the invention;

FIG. 9 is a longitudinal section of an axial retaining cap of a termination according to the invention;

FIG. 10 is a longitudinal section of a fixing grip of a termination on a connector according to the invention and taken on the line X—X of FIG. 10;

FIG. 11 is a radial section of the grip of FIG. 10 along the line X—X of this figure;

FIG. 12 shows a possible modification of an optical fiber termination usable with one of the connectors according to the invention;

FIG. 13 is a schematic diagram of the positioning of the termination spacing rods in the bore of a connector according to a second embodiment of the invention;

FIGS. 14 and 15 are similar diagrams of two further embodiments of a connector according to the invention;

FIG. 16 is a longitudinal section through the line XVI—XVI of FIG. 17, of a connector provided with a first radial pressure means on the spacing rods;

FIG. 17 is a cross-section through the line XVII—XVII of FIG. 16;

FIG. 18 is a longitudinal section through the line XVIII—XVIII of FIG. 19 of a connector provided with a second type of radial pressure means;

FIG. 19 is a section through the line XIX—XIX of FIG. 18;

DESCRIPTION OF PREFERRED EMBODIMENTS

Figure 21:
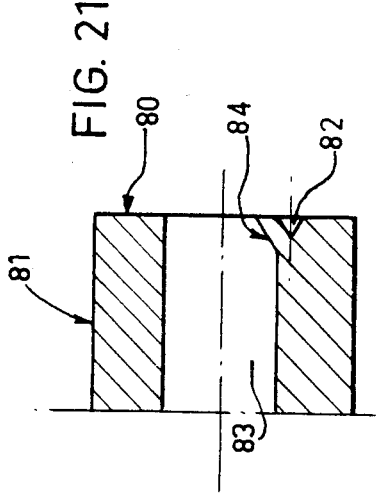
FIG. 21 is a section through the line XXI—XXI of FIG. 20.
Figure 23:
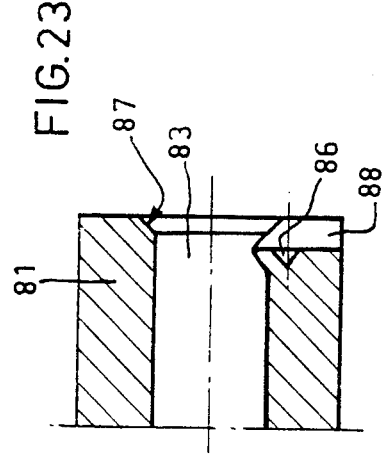
FIG. 23 is a section through the line XXIII—XXIII of FIG. 22.

As shown in FIG. 1, the optical fiber 1 is gripped in the interstitial space existing between three identical cylindrical spacing rods A, B, C, in tangential pairs, and of suitable diameter so that each of them is also tangential to the axial fiber. The circumscribed diameter d of the three spacing rods A, B and C is centered at o, the center of the cross-section of the fiber. These three rods A, B and C are lodged inside a circle of diameter D slightly greater than the diameter d. If radial pressure P is exerted on the rod A, the three rods A, B and C are pushed back against the opposite concave side of the circle D and subjected, by reaction, to radial pressures R which tend to press them against the central optical fiber.

The termination shown in FIG. 2 is constructed according to this principle, that is to say that it is essentially constituted by three spacing rods A, B, C gripping the end of an optical fiber 1 to which they are bonded, for example by gluing, or again by means of a base 2 of plastics material overmolded at the rear of said rods and onto the the fiber itself. Preferably, the base 2 has a shoulder 3 including a stop surface 4 oriented towards the end of the fiber. The junction connector (FIG. 4) is constituted by a tubular sleeve 5 traversed from side-to-side by a concentric bore 6 of diameter D designed to receive on each side, one optical fiber termination slidingly ensleeved with play, said terminations joining endwise substantially in the median radial plane of the bore. On each side of said median plane, the connector 5 includes at least one transverse countersunk slot 7 on its periphery, the depth of this countersinking being such as to form in each case a thin, inwardly convex web or wall 8 protruding into the bore 6. The distance between the surface of the wall 8 situated on the inside of said bore, beneath the countersunk slots, and the opposite side of the bore, is H, namely less than the diameter d of the circumscribed cylinder of the spacing rods of an optical fiber termination. On the other hand, the connector 5 also includes, on both sides of its median radial plane, and on the opposite side to the thinned walls 8 with respect to the axis of the bore, pins 9 forcefitted into a hole pierced in the wall of the sleeve of the connector, and projecting into the bore 6 of the latter. The projecting part of said pins is fashioned in cone shape, so as to engage the V shaped slot or groove with rounded sides, formed by two adjacent spacing rods of a termination, the role of each pin being, on the one hand, to position said terminations angularly in the bore, so that the axis of the third spacing rod opposite said V shaped groove formed by the two other spacing rods is situated in the longitudinal plane of symmetry of the countersunk slots 7, and on the other hand, to guide each termination during its sliding into the sleeve 5 until the stop surface 4 of the base of the latter seats upon the corresponding end surface 10 of the sleeve. The sleeve 5 is formed preferably of metal, for example, of heattreated steel, so as to accentuate its elasticity so that the webs or thin walls pushed radially inwardly or towards the inside of the bore exert, by elasticity, a strong pressure on the spacing rod of the termination which becomes positioned below the latter. In fact, due to the fact that the distance H between the inner surface of the thinned walls and the opposite side of the bore is less than the diameter d of the cylinder circumscribing the spacing rods of a termination, said thinned wall is pushed back outwardly when the termination is engaged by sliding into the connector, and by reaction, said wall exerts an elastic radial pressure which wedges said termination against the opposite concave side of the bore 6.

These thinned walls 8 hence play a double role of holding the terminations inside the connector, by gripping and centering of the latter, with respect to one another, due to the fact that they excenter identically the two optical fibers to be aligned.

In FIG. 6, the junction device according to the invention, is shown mounted, that is to say the two terminations of the two optical fibers to be connected are fully ensleeved inside the connector 5, the length of penetration of said terminations being limited on the one side of the sleeve by a stop surface 4 of a base 2 which is urged against the corresponding face 10 of the connector, and on the other side, through the end contact of the two terminations, a slight axial play e being preserved between the stop surface of the base of the second termination and the other surface of the corresponding end 10 of the sleeve 5. This intercalary play enables it to be ensured that the two abutting surfaces of the optical fibers to be connected are well in contact inside the bore 6, along the junction plane 11 which is hence situated substantially at the level of the median plane of the connector 5.

As shown in FIG. 6, the guide pins are situated at the level of a neighboring section of the countersunk slots 7, but it is obviously possible to contemplate, on the contrary, the positioning of said pins in the neighborhood of the two entrances of the bore 6 so as to facilitate the engagement of the terminations inside the connector.

This is what is shown in FIG. 8 which relates to a modification of the device according to the invention, which includes, no longer one countersunk slot per termination, but two spaced countersunk slots 7, exerting substantially equal pressures P on said termination, on the one hand close to the junction surface, and on the other hand towards the rear, close to the base.

To protect the thinned walls 8 of the countersunk slots 7, and also to prevent accidental extraction of the pins, the sleeves 5 of the connector may be mounted clamped inside a tubular protective sheath 12, of steel or of plastics material, for example.

Of course, the use of four countersunk holes, in the proportion of two per optical fiber termination, constitutes an additional assurance against possible longitudinal misalignment, since in this way, each termination is urged substantially equally at two axially separated points, which prevents any possibility of tilting. The number of countersunk slots is obviously not limited, nor moreover that of the pins which can be driven into the sleeve 5, either in alignment parallel to the axis of the latter, or again distributed at 120° around said axis.

As a modification, it is also possible to replace the guide and angular positioning pins by a rectilinear cotter engaged in a groove formed in the bore 6, on the side opposite the thinned clamping walls 8.

According to the invention, a junction device is obtained which is easy to produce, hence economical, ensuring nonetheless the precision required for obtaining perfect alignment between the fibers, and a junction resulting in the minimum of loss and attenuation of the transmission. This junction device is applicable not only in the field of telecommunications, but also in any other field using light wave transmission, for example in the surgical field, notably for endoscopes.

The radial pressure forces P exerted by the thinned parts 8 of the connector on the terminations of the joined optical fibers may be insufficient to retain the terminations axially if tractions are exerted on the sheets of the fiber 1. Thus end holding means can be provided; said means can be, for example, caps 13 (FIG. 9) pierced by a central hole 14 traversed by the sheath of the corresponding fiber 1 and screwed on the threaded ends 15 of the connector 5, said caps being supported by an annular radial surface 16 against the rear surface 17 of the shoulders 3 of the bases 2 to maintain sufficient contact pressure between the two surfaces polished by grinding the ends of the terminations, said pressure being all the higher as the screwing of the caps 13 on the connector 5 is increased; lock nuts 18 prevent the unfastening of the caps. Instead of these screwed caps, nonetheless it can be preferred to have retaining members positioned by clipping, which facilitates and accelerates assembly, these members being possibly, for example, clamps 19 such as that shown in section in FIGS. 10 and 11.

These clamps 19 of generally cylindrical tubular shape, comprise a base 20 pierced by a hole 21 for the passage of the sheath of the optical fiber 1 and a lateral wall 22 divided circularly at regular intervals by slits 23 starting from the bottom 20 and opening at the other end of the clamp, these slits 23 defining tongues 24 oriented axially and capable of being elastically separated outwardly. At their free end, said tongues 24 are provided with an upset part or boss 25 projecting in the direction of the axis of the clamp so as to define an entry orifice of less diameter than the inner diameter of the lateral cylindrical wall 22 which is itself slightly greater than the diameter of the cylindrical ends 26 of the connector 5. These bosses are either of rounded shape, or include an entry bevel 27.

A clip engagement groove 28 is provided at each end of the connector 5, the bosses 25 being designed to become clipped in said grooves after having advanced over the ends 26 of the connector by separation of the tongues 24 and slid up to these grooves.

At the end of each clamp 19 is provided an elastic compression means such as a spiral or leaf spring for example, in the form of a washer 29 designed to be urged against the bottom 20 of the clamp and the rear surface 17 of the shoulder 3 of the base of the corresponding optical fiber termination so as to push back the latter towards the inside of the connector and to maintain the pressure of its surface in abutment with the opposite surface of the other termination.

The rear radial surfaces 30 of the bosses of the tongues 24 as well as the two sides of the two clipping grooves 28 may be provided perpendicular to the axis of the clamps 19 and of the connector 5, which prevents accidental tearing off of the clamps, even under very strong traction, but necessitates on demounting the separation of the tongues 24 to disengage the bosses 25 from the grooves; the rear surfaces 30 as well as the corresponding sides of the clipping grooves 28 can also be inclined (FIG. 10) which facilitates dismounting by a sufficiently strong simple traction rearwards which obliges the bosses 30 to retract along the inclined side of the corresponding groove and separate the tongues 24. In the latter case and to avoid accidental disengagement, it is possible to provide for the protective sheath 12 previously described to come into covering relationship on tongues 24 of the clamps 19, said sheath 12 no longer being mounted gripped but with a play so as to be slideable rearwards to disengage said tongues and enable dismounting, accidental sliding being prevented for example, by a set screw 31, whose point is engaged in a groove of triangular section 32 formed in the surface of the protective sheath 12 or again by clipping a bead shaped deformation 33 of the body of the tongues 24 which are clipped in a corresponding groove 35 formed in the bore 36 of the sheath 12.

Of course, the invention is not limited to only the embodiments previously described, but it also covers any modifications which would differ only in details. Thus, for example, the pressure on the optical fiber terminations can be produced by any other known means, such as leaf parts or springs, screws, wedges, etc.

Thus, also, instead of using two distinct elements, on the one hand to exert pressure on the optical fiber termination, and on the other hand to guide the latter in sliding within the connector 5, it is possible to arrange for these two functions to be fulfilled by one and the same element, such as for example, a thinned wall of the connector extending over a length sufficiently long parallel to the axis of the bore so that on the one hand, it plays the role of a guide key enchased between the rounded sides formed by two adjacent spacing rods of a termination, and on the other hand, to thrust elastically on said sides of these two rods, so as to push back the termination against the opposite incurved side of the bore housing the latter.

In addition, the scope of the invention is not limited only to junction devices including terminations essentially constituted by spacing rods A, B, C surrounding the optical fiber 1, but it also covers any junction devices having a connector similar to that previously described but using different terminations, such as for example, that shown in FIG. 12.

This termination includes a hollow body 37 provided with an axial added or integral centering part 38, pierced by a hole 39 of diameter substantially equal to that of the optical fiber 1 to be connected. The bared end of said fiber as well as those of its protective sheaths 40 and 41 housed in the cavity 42 of the hollow body 37 are buried in a filling and binding material 43 ensuring the fastening. The hollow body 37 is connected in any manner to a rear base 44 provided with a support shoulder 45 whose functions are the same as those of the shoulders of the bases 2 of the spacing rod terminations A, B, C previously described.

This hollow body 37 possesses an outer diameter d slightly less than the diameter D of the bore 6 of the connector and greater than the passage height H beneath the inwardly deformed thinned walls 8 of said bore, a guide and angular positioning groove 46 being provided in the outer surface of the hollow body 37, parallel to the axis of the latter, said groove 46 being designed to receive the ends of the guide pins or the corresponding key of the latter.

In a second possible embodiment of the connector, the latter includes a bore designed to receive termination rods, which has a diameter slightly less than that of the cylinder circumscribed on these rods, and a longitudinal groove is formed in the inner wall of this bore to receive the part of one of the rods which extends beyond the diameter of the bore when the other rods are tangential to this wall.

As is shown in FIG. 13, the three rods A, B, C are inscribed in a cylinder of diameter d. These three rods are threaded, with the optical fiber arranged axially between them and not shown, into the bore 56 of the connector, whose diameter D is somewhat less than that of d of the circumscribed cylinder and in the wall of which is formed a longitudinal, inwardly concave groove 57, with a circular arcuate section, adapted to receive the part of the rod A which extends beyond the diameter D when the rods B and C are tangential to the wall of the bore 6.

Thus as shown in FIGS. 14 and 15, the groove 57 can also have a triangular section 57a (FIG. 14) or rectangular 57b (FIG. 15) or any other suitable crosssection.

The means provided to ensure radial pressure on one of the spacing rods may be those provided above, that is to say a thinned wall portion of the bore, at the bottom of the above-mentioned groove, which portion is pushed back towards the axis of the bore.

However, according to a preferred embodiment, these means are constituted by at least one spring of which a part is urged on to a part of the body of the connector and at least one other part projecting into the groove, through an opening formed in the wall of the bore of the connector, to be applied on the rod engaged in the groove.

This spring can be, for example, formed from an elastic blade of which one end is fastened at the bottom of an outer slit formed in the body of the connector, whilst its other end is curved to project into the inner groove of the bore through an opening communicating the outer and inner grooves.

It is also possible to provide two leaf springs extending on both sides of this opening so that their free ends are curved face-to-face, or a single blade of which the central portion is fastened to the bottom of the outer groove and of which the two ends are curved and each projects through an aperture opening into the inner groove.

In the example shown in FIGS. 16 and 17, the body 55 of the connector, in which the bore 56 is formed with its inner groove 57, is externally notched at 58, and two external longitudinal grooves 59 are formed in the bottom of the notch 58, these two grooves 59 being separated by a second notch 60 cut into the bottom of the notch 58 and opening into the inner groove 57. In each of the grooves 59 is arranged one of the ends of a leaf spring 61 which is held in its groove by crimping effected by turning back a part of the edges of the groove 59 as shown at 62. The other end of the springs 61 is curved at 63 and projects into the bore 56 through the notch 60.

When the spacing rods A, B, and C and the optical fiber that they grip are slidingly lodged into the connector 55, in a similar way to that described above, the rod A becomes housed in the groove 57 whilst the two other rods B and C remain in contact with the wall of the bore 56, and the springs 61 ensure, by radial pressure on the rod A, the clamping and centering of the optical fiber between the three spacing rods.

In the example of FIGS. 18 and 19, there can again be seen the body 55 of the connector with its bore 56, the inner groove 57 of the latter and an outer notch 68, shorter than the notch 58 of FIGS. 4 and 5. At the bottom of the notch 68 and at each of its ends are formed two deeper notches 70 which open into the inner groove 57 and leave a bridge 74 between them. In the latter is formed an outer groove 69 which receives the median part of a leaf spring 71, crimped on both sides 72 in said groove. The two free ends 73 of the spring 71 are curved back to project into the bore 56 through the respective cut-outs 70. The mounting of the spacing rods A, B, C with the optical fiber is carried out as in the preceding case, clamping being ensured here by the two ends 73 of the spring 71.

It can be seen that it is possible advantageously to arrange several sets of springs 61, or several double springs 71 with the corresponding notches over the length of the connector, to ensure the equilibrating of the clamping and perfect centering of the optical fiber between the spacing rods A, B and C.

It will also be seen that other modifications could be introduced into the invention without departing from its scope as defined by the appended claims. Thus the cut-out such as 58 or 68 formed in the body of the connector could open entirely into the inner groove of the bore, even overlapping on both sides of the latter as is the case of the notches 60 or 70, the radial pressure means then being constituted by a bracelet shaped spring surrounding the connector penetrating into said notch to thrust against the rod engaged in the inner groove.

Thus also, according to a third embodiment of the junction connector as shown in FIGS. 20 to 23, the angular positioning of the terminations of the optical fibers inside the bore of said connector as well as the guiding of the sliding of said terminations in this bore is obtained by a different means, namely pins 9 (FIGS. 4 to 8) or guide grooves 57 (FIG. 13) previously mentioned; this means can be notably a deformation of the entrance surface of the bore resulting in a deformation of the bore itself.

Figure 20:
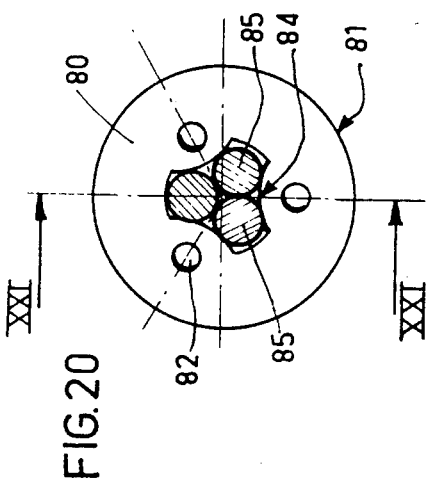
FIG. 20 is an end view of a connector according to a third embodiment of the invention and taken on the line X—X of FIG. 21.
Figure 22:
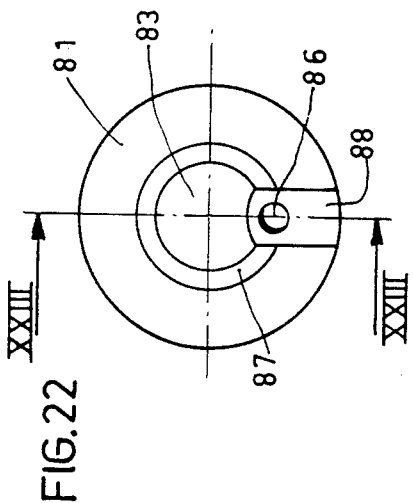
FIG. 22 is a modification of the embodiment of the invention of FIG. 20.

As shown in FIGS. 20 and 21, each end surface 80 of the connector 81 is deformed into a hollow by three blows with a center punch 82 distributed at 120° around the bore 83, these punchings 82 resulting in the formation of three projections 84 inside the bore itself whose cross-section is no longer circular but of generally triangular shape. Each projection 84 extends into a V shaped groove with rounded sides formed by two spacing rods 85 adjacent to the termination to be oriented and ensures both its angular positioning and its guidance inside the bore 83 of the connector 81.

The orientation of the terminations can also be obtained by a single blow of the centering punch 86 instead of the three as indicated above, and to facilitate the introduction of the terminations into the bore 83 of the connector, an entrance bevel 87 can be provided (FIGS. 22 and 23), the single centering punch blow being made at the bottom of a radial groove 88 formed in the entrance surface 80 of the connector 81 so that said surface remains perfectly flat notably to serve as a support for the stop surfaces of the bases of the terminations.

We claim:

1. A junction device for joining an optical fiber end to end with another optical fiber, said device comprising at least three uniform, parallel, cylindrical rods in tangential engagement with one another and defining an opening therebetween for the accommodation of one of said fibers; a sleeve having therein a bore within which said rods are accommodated; elastic means carried by said sleeve and exerting on one only of said rods a radially inward elastic force, said one of said rods transmitting said elastic force to the remainder of said rods to urge the latter into engagement with the surface of said bore; and guide means carried by said sleeve and extending into said bore for guiding and positioning said rods.

2. Device according to claim 1, wherein said elastic means comprises a thinned wall portion of said sleeve which projects into said bore.

3. Device according to claim 2, wherein said sleeve has two of said thinned wall portions spaced longitudinally of said sleeve.

4. Device according to claim 1 wherein said guide means comprises at least one projection extending into said bore and arranged to be accommodated between two of said rods.

5. Device according to claim 1, wherein said guide means comprise pins fixed radially in the wall of the sleeve and extending into the bore of the latter in positions to fit between two of said rods.

6. Device according to claim 1, wherein said guide means comprises a groove in the bore of said sleeve and a key accommodated in said groove, said groove being formed in the side of said bore opposite said elastic means.

7. Device according to claim 1, wherein the bore of the sleeve has a diameter slightly less than that of a cylinder circumscribing said rods, said sleeve having a longitudinal groove in its bore receiving the part of one of said rods which exceeds the diameter of the bore.

8. Device according to claim 7, wherein said elastic means comprises at least one spring of which a part is supported on said sleeve and at least one other part projects into said groove through an opening formed in said sleeve.

9. Device according to claim 8, wherein the spring is formed by an elastic blade of which one end is curved to project into the bore.

10. Device according to claim 1 including positive axial retaining means at opposite ends of said sleeve.

11. Device according to claim 10, wherein said axial retaining means comprise caps screwed onto the opposite ends of the sleeve, said caps being perforated to permit passage therethrough of the optical fibers.

12. Device according to claim 10, wherein said axial retaining means comprise gripping elements including a perforated bottom enabling the passage of the corresponding fiber, and elastic axial tongues provided at their free end with a boss adapted to seat in a notch provided at the periphery of the ends of the sleeves.

13. Device according to claim 1, including a rigid tubular protective sheath encircling said sleeve.

14. A junction device for joining an optical fiber end to end with another optical fiber, said device comprising a sleeve having a cylindrical bore therein; two terminations accommodated end to end in said bore, each of said terminations comprising three uniform, parallel, cylindrical rods in tangential engagement with one another and defining an opening therebetween for the accommodation of one of said fibers, elastic means carried by said sleeve adjacent each of said terminations and exerting on one of the rods of each of said terminations in independent, radially inward force which is transmitted by said one rod to the associated other two rods to urge the latter into engagement with the surface of said bore; and guide means extending into said bore for axially guiding and angularly positioning said terminations.

* * * * *